United States Patent

Nielsen, Jr.

[15] 3,700,268

[45] Oct. 24, 1972

[54] POSITIVE LOCKING TERMINAL BUSHINGS FOR FLEXIBLE PIPE

[72] Inventor: Anker J. Nielsen, Jr., 410 Bailey Rd., Holden, Mass. 01520

[22] Filed: July 2, 1969

[21] Appl. No.: 847,775

Related U.S. Application Data

[62] Division of Ser. No. 522,877, Jan. 25, 1966, abandoned.

[52] U.S. Cl. .................285/55, 285/249, 285/343, 285/348, 285/382.7
[51] Int. Cl. .................................................F16l 9/14
[58] Field of Search.....285/382.7, 15, 348, 339, 341, 285/342, 343, 353, 340, 423, 243, 244, 246

[56] References Cited

UNITED STATES PATENTS

| | | |
|---|---|---|
| 2,239,252 | 4/1941 | Sander................285/382.7 X |
| 2,452,277 | 10/1948 | Woodling..............285/348 X |
| 3,375,025 | 3/1968 | Engel.........................285/15 |
| 2,316,806 | 4/1943 | Parker................285/382.7 X |
| 2,349,180 | 5/1944 | Lamont...............285/382.7 X |
| 2,478,149 | 8/1949 | Wolfram et al.....285/382.7 X |
| 3,368,831 | 2/1968 | Phillipps..............285/382.7 X |
| 3,375,025 | 3/1968 | Engel........................285/348 |

FOREIGN PATENTS OR APPLICATIONS

1,257,824  2/1961  France......................285/342

Primary Examiner—Dave W. Arola
Attorney—Robert K. Randall

[57] ABSTRACT

This device is an adapter for joining flexible tubing run through a rigid pipe to such pipe and to continuing rigid piping, in both fluid-tight and mechanically positive relation. When the adapter is screwed on to the rigid pipe, the end of the pipe presses a non-metallic gasket into sealing relation with the protruding end of the flexible tubing and the adapter and forces a deformable metallic ring to contract about the tubing and crimp the tubing into a preformed groove in a metallic sleeve within the tubing. Stop means keeps the parts from exerting destructive pressure on the gasket.

3 Claims, 4 Drawing Figures

Patented Oct. 24, 1972
3,700,268
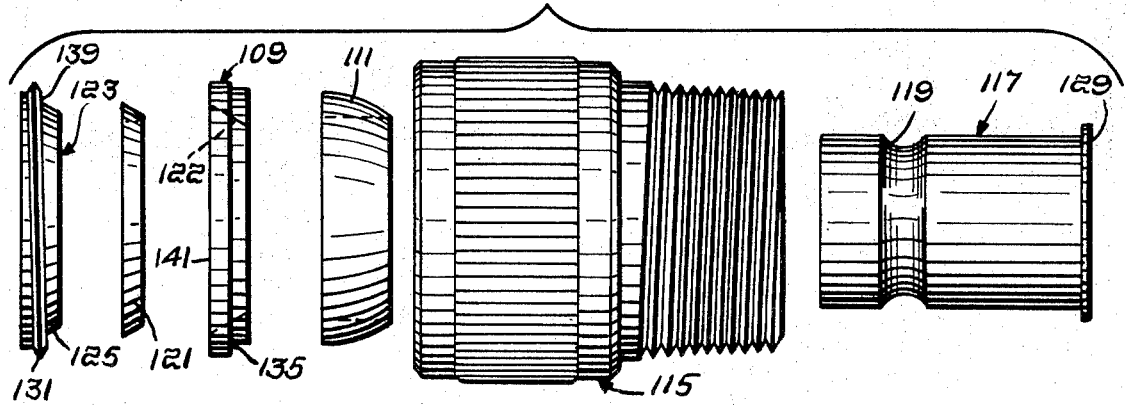
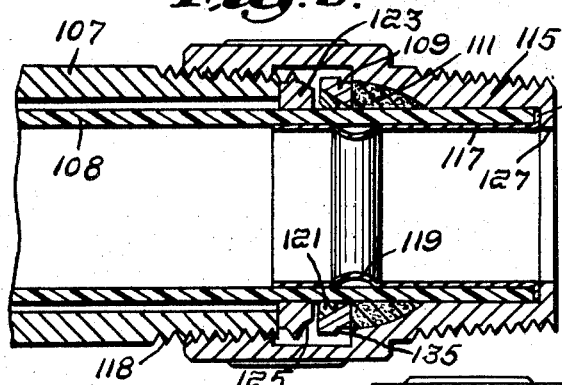
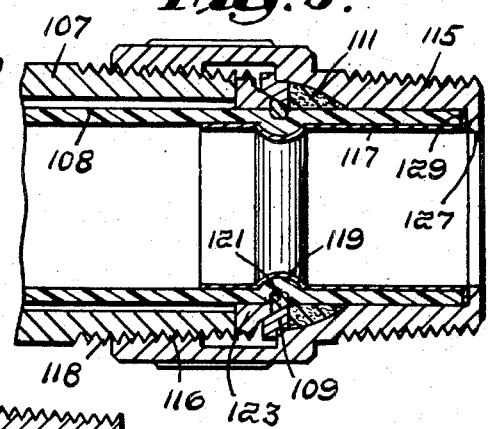
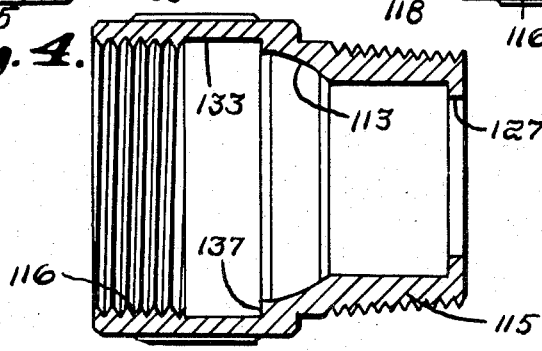
Inventor:
Anker J. Nielsen, Jr.
by Robert K. Randall
Attorney

POSITIVE LOCKING TERMINAL BUSHINGS FOR FLEXIBLE PIPE

This application is a division of my application, Ser. No. 522,877, filed Jan. 25, 1966 and now abandoned.

This invention relates to devices for joining non-threadable thin-walled flexible and deformable tubing or pipe to rigid pipe of fittings in a manner that will be both fluid-tight and mechanically fixed and positive.

Such connecting means are widely used in the repair or replacement of existing iron service pipe lines which require renewal because of leakage, corrosion, or other reasons. It has become common practice to effect renewal by running a continuous length of soft copper or plastic tubing through the old iron house service pipe, thereby saving the labor, cost, and delay of digging up and relaying buried service pipe lines for gas, water or other fluids. All that remains to be done is to join one end of the tubing to the street main and the other end to the meter connection or other existing iron piping inside the building, which latter joining for safety and strength should be made within the iron pipe or fittings thereon. Especially in the case of gas pipes, the delivery end of the tubing must be hermetically sealed to the interior of the iron pipe or fitting, to prevent back-flow of gas through the space between the two pipes, with eventual escape through leaks or at the cut-off end of the iron pipe adjacent the main.

The present invention aims as indicated to provide improved means for making mechanically positive and fluid-tight connection between a rigid pipe or fitting and a flexible pipe or tubing therein, in other words, a positive locking terminal tee, bushing or adapter for flexible pipe within a rigid pipe.

To this end, the invention provides a novel form of terminal bushings and service head adapters, so-called, which includes in combination a sleeve having a taper seat surrounding a pipe, a gasket within such seat, a deformable continuous metallic ring to surround the pipe within the sleeve, a presser ring intervening between the gasket and the deformable ring to press the gasket into gas-tight sealing relation to the pipe, the presser ring having a taper seat occupied by the deformable ring, an annular member around the pipe to press the deformable ring into the taper seat and thereby contract this ring to grip the pipe, and screw means in connection with the sleeve to actuate the rings.

A leading object of the invention is to control the pressure applied to the gasket in installing it and to maintain such pressure during service. Hence novel provision is made both to protect the gasket from damage through vigorous tightening of the parts in installing, and also to reduce the likelihood of looseness arising from excessive caution in applying, thus enabling these devices to be installed correctly by persons of varying degrees of skill and familiarity therewith. Previous connectors have been deficient in provision to prevent distortion of and damage to the gasket by reason of cold flow of the component neoprene, rubber, or other gasket substance caused by too great mechanically applied pressure, and incomplete confinement, and have provided too scant leeway between too much and too little tightening of the parts to avoid occasional inadequate sealing pressure, in either situation resulting in leakage. Many times a T or other angle fitting, which must be turned to match the angle of the pipe to which it is joined, must go beyond or stop short of the optimum gasket pressure when such is as customary a critical function of the screwing together of the parts. It is of course impossible for the mechanic to observe or detect what is happening to the gasket. These difficulties are overcome or minimized by this invention.

The manner and means of applying the principle of the invention to attain these and other objects are as set forth hereinafter.

An illustrative embodiment of the invention is shown in the drawings, in which:

FIG. 1 shows in side elevation the parts of a terminal adapter of bushing type as modified to seal plastic tubing within an iron or other rigid service pipe.

FIG. 2 is an axial sectional view of the terminal adapter bushing of FIG. 1 applied to seal plastic tubing within an iron pipe, before the parts are tightened.

FIG. 3 is a similar view of the parts of FIG. 2, after the parts have been tightened.

FIG. 4 is an axial sectional view of the bushing of FIGS. 1 to 3.

The figures show an application of the invention principle to seal plastic tubing to the end of an iron pipe and thus provide for rigid connection of the line to an iron pipe fitting. This adapter for plastic tubing utilizes the end of the iron pipe 107 as the press to force a metallic compression ring 109 to press an non-metallic gasket 111 into a taper seat 113 in a bushing 115, when the latter is screwed home by its thread 116 onto the thread 118 on the pipe. To support the plastic tubing 108 against the inward pressure of the gasket as the latter is compressed, a metallic sleeve 117 is first inserted in the tubing, having an outside diameter substantially equaling the interior diameter of the tubing. Thus the compressed gasket is able to make a gas-tight and watertight seal between the tubing and the bushing.

To lock the plastic tubing 108 to the adapter bushing 115 and thus to the iron pipe, i.e., to provide the mechanical seal, the sleeve 117, preferably of stainless steel, is formed with a peripheral groove 119 into which the tubing is diverted radially inward. This is done by a deformable metal locking ring 121, initially larger than the tubing's diameter, which second ring 121 is forced to contract radially by being wedged into the conical or tapered interior 122 of the compression ring 109, the locking ring 121 having a matching taper on its outside. The locking ring 121 is forced into the compression ring by a third ring or washer 123 engaged by the end of the pipe 107 and having a tapered portion 125 matching the taper 122 inside the compression ring 109, enabling it to enter the ring 109 as shown in FIG. 9 and shrink the locking ring inward about the plastic tubing, indenting the latter in annular manner and forcing it down into the groove 119.

It will be noted that the bushing 115 has at its small end a radial shoulder or flange 127 overlapping the end wall of the tubing 108, and that the sleeve 117 has a flange 129 as wide as the wall thickness of the tubing. When the sleeve is inserted till this flange 129 meets the end wall of the tubing, with the latter projecting at least the length of the sleeve from the iron pipe, and when the bushing 115 is installed with its shoulder 127 against this flange 129, the locking ring 121 is assured of being centered within the groove 119 made for the inward diversion of the wall of the tubing, by the cooperation of these locating flanges as the bushing is screwed onto the iron pipe.

A turn or two of screw thread 131 loosely fitting the thread 116 in the bushing 115 enables the device to be delivered to the user as a unit with all the parts assembled as shown in FIG. 2, (with the exception of the iron pipe 107 and the tubing 108,) the washer 123 lying loosely in the recess 133 and preventing escape of the parts 109, 111, and 121, or improper assembly. The user merely engages the bushing's thread 116 with the thread 118 of the iron pipe, with the sleeve 117 within the plastic tubing, and screws the bushing on as far as it will 90.

To control the pressure applied to and maintained in the gasket 111 so as to avoid injury thereto, the compression ring 109 which applies this pressure is formed with a shoulder 135, FIG. 1, which engages the confronting radial wall 137, FIG. 4, of the recess 133 and serves as a stop limiting the extent of entry of the reduced end of this ring into the taper seat 113, and thus determines the volume of the space into which the gasket is to be compressed, and the resulting pressure within the gasket.

The crimping of the locking ring 121 about the plastic pipe is similarly controlled by providing a shoulder 139, FIG. 1, which brings up against the radial face 141 of compression ring 109 to stop the entry of the taper portion 125 into ring 109. It is through the coengagement of this shoulder and this face that the sealing pressure applied by ring 109 to the gasket is derived from the thrust of the end of the iron pipe 107 as it enters the bushing. This coengagement, and the encounter of shoulder 135 with wall 137, determine the extent of such entry. Ring 121 wedges tightly and permanently in taper seat 122.

The invention is characterized by provision for applying adequate sealing pressure to the gasket while automatically protecting it from disabling or destructive excesses of such pressure.

While I have illustrated and described one form in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but What I do claim is:

1. A terminal bushing for connecting plastic tubing extending through a rigid pipe to such pipe and to further fluid-conducting means in both fluid-tight and mechanically positive relation, comprising in combination an internally screw-threaded tubular body to be fixed on the pipe and having a seat for the end of the tubing, a gasket in such seat to surround the tubing, a ring within the body to encircle the tubing and compress the gasket, and having a taper seat, a continuous deformable metallic ring within the body to encircle the tubing and occupy the taper seat, a grooved sleeve within the body to fit within the tubing, and an annular member within the body to surround the tubing and to be engaged by the end of the pipe and to force the deformable ring into the taper seat and thus to contract this deformable ring to crimp the tubing into the groove in the sleeve and lock the tubing to the bushing.

2. The combination according to claim 1 in which co-engaging shoulders on the body and on the ring which compresses the gasket limit the pressure which can be applied to the gasket.

3. The combination according to claim 1 in which the annular member is externally threaded for screw-threaded engagement with the body.

* * * * *